March 10, 1970     H. SCHRODER     3,499,547

MECHANISM FOR TRANSPOSITION OF PIECES OF DOUGH

Filed Feb. 19, 1968     10 Sheets-Sheet 1

Fig. 1

INVENTOR.
HERBERT SCHRÖDER

March 10, 1970  H. SCHRODER  3,499,547
MECHANISM FOR TRANSPOSITION OF PIECES OF DOUGH
Filed Feb. 19, 1968  10 Sheets-Sheet 2

Fig. 2

INVENTOR.
HERBERT SCHRODER

Fig. 5

INVENTOR.
HERBERT SCHRODER

March 10, 1970 H. SCHRODER 3,499,547
MECHANISM FOR TRANSPOSITION OF PIECES OF DOUGH
Filed Feb. 19, 1968 10 Sheets-Sheet 9

INVENTOR.
HERBERT SCHRODER

United States Patent Office 3,499,547
Patented Mar. 10, 1970

3,499,547
MECHANISM FOR TRANSPOSITION OF PIECES
OF DOUGH
Herbert Schroder, Angerstrasse, Staffelstein,
Offenbach, Germany
Filed Feb. 19, 1968, Ser. No. 706,380
Claims priority, application Germany, Feb. 23, 1967,
Sch 40,298
Int. Cl. B25j 11/00; B66c 1/42
U.S. Cl. 214—1
13 Claims

ABSTRACT OF THE DISCLOSURE

The grasping head and support of a kneading board or baking sheet are displaceable in distance from each other and laterally, with the trajectories of the board and sheet running beneath the grasping head and controlled by switches, the head being coupled by links and counterbalanced, and tiltable through 90° and immobilizable, and the displacements of the head being controlled by cams for grasping, transposing and repositioning of pieces of dough, with ejection of supports at appropriate times.

---

The present invention relates to improvements in a mechanism for transposition of pieces of dough, comprising a grasping head situated on a stand or upright and equipped with prehensile devices.

During the production of alimentary pastes in piece-form, a great number of pieces of dough must be picked up from one base and laid down again on another base quickly, or on a different area of the same base. The pieces or dough must be repositioned or realigned if their mutual arrangement is disturbed by said transposition. The invention relates in particular to a mechanism for transposition and repositioning or realigning of pieces of dough.

During production of bread rolls, soft pieces of kneaded or molded dough are produced, namely so-called "moldings", initially lying on a first base such as a kneading or molding board, from which they are transposed on to a second base such as a baking sheet, stowing board or the like, and repositioned or realigned thereon. The invention relates specifically to a mechanism for transposing dough moldings from a kneading board on to a baking sheet.

For transposing pieces of dough, these are grasped for removal from a base, held during the transfer, and released for laying down on to a base. A grasping head comprising a number of grasping or prehensile devices, is employed for grasping and releasing a set of pieces of dough.

The object of the invention is to effect an improvement in mechanisms of the nature specified, by means of which pieces of dough or dough moldings may be transposed and repositioned in rapid and reliable manner, such that said mechanism is reliable in operation, easy to operate and service, and requires but little space. It is another object of the invention to improve already existing or suggested grasping heads, so that these are more advantageous in practice.

The mechanism according to the invention is characterised in that the grasping head and a support, holder bracket or the like situated beneath the head and intended for a base such as a kneading board or baking sheet, are mutually displaceable to change their relative spacing, and that the grasping head on the one hand, and the base formed by a kneading board or baking sheet on the other hand, may be displaced laterally relative to each other, specifically in such manner that the trajectories of two bases such as a kneading board and baking sheet, meet each other under the grasping head, which latter may be fixedly arranged on the stand or upright and not displaceable laterally. The trajectories of the two bases during lateral displacement meet each other in the operating space situated beneath the grasping head, intersecting, overlapping, merging, crossing or extending together or parallel beside or above one another.

During a transposing action performed with this mechanism, the grasping head and its support move in the vertical direction to change their mutual spacing, and the bases move horizontally, that is to say laterally relative to each other. The grasping head need not be moved laterally during the transposing operation in this case. In some forms of embodiment of the invention, the grasping head may however perform slight motions coupled with the distance-varying displacement but not contributing to the change in said distance, and which do not play a part in the positional exchange of the two bases beneath the grasping head. Changes in the distance between the grasping head and base, which are required for a transposing action, are performed not only by the grasping head and the base, but also by the grasping or prehensile devices relative to the grasping head.

During a transposing operation performed with the mechanism according to the invention, the grasping head and support are first moved away. The kneading board is then inserted into the working space situated beneath the grasping head, and positioned on the support. The grasping head and the support are then moved towards each other and away from each other again. The kneading board is thereupon drawn away from the grasping head, and the baking sheet is inserted under the grasping head. The grasping head and the support may then contingently be moved towards and away from each other again. The baking sheet is finally drawn away from the grasping head. The invention also has as its object a device according to the inventive principle, which operates as specified above, and in which the support and the grasping head are displaced relative to each other in distance-varying manner as described above.

The device according to the invention and its mode of operation described above, are organized to correspond to the operating conditions and sequences applicable in the production of dough moldings which are not produced singly and consecutively, but in batches on kneading or molding boards. These batches of dough moldings are carried into the working space situated under the grasping head. During the transposing operation, lateral displacement is applied to the kneading board and baking sheet only, which must be displaced laterally in particular, in connection with other operating steps as well. The grasping head, which is very heavy compared to a kneading board or to a baking sheet, is at rest in the lateral direction during a transposing operation.

In order to provide control over the displacements and actions of the grasping head and its grasping devices, it is specified according to the invention that a switch-on element for displacement of the grasping head be positioned below the grasping head in the path of travel of the one base and preferably of the kneading board, and that a switch-off element of the driving system be positioned for actuation as a function of the change in distance. The control elements may be so organized in this device that when the base is inserted below the grasping head, the entire device is switched on by the switch-on element, for evolution of the displacements and actions of the grasping devices during repositioning, grasping and laying-down operations. Upon termination of the displacements and actions of the grasping devices applied for transposing a batch of pieces of dough, as well as of those of the grasping head, the switch-off element automatically stops the device again. The device is thus reliable in operation and economical, since it is started up only when a base is inserted, and is switched off upon termination of the transposing of a batch of pieces of dough, and no later.

Another inventive development of a device described earlier resides in that ejection of one base from the working space situated beneath the grasping head is performed as a function of a change in the distance of the grasping head from the support of the base, with a delay after the beginning of such an increase in distance following upon the action of grasping devices of the grasping head. In this device, the base is not ejected as a function of a transposing displacement of the grasping devices, nor as a function of actions performed by the grasping devices. On the contrary, the very rapid withdrawal of the base is initiated direct by change in the spacing. The particular structure of the grasping head does not affect the ejecting action.

The invention moreover provides a mechanism of the kind specified in the foregoing, which is characterised in that eccentrics, hereinafter referred to as spacing cams, are incorporated in such manner that they displace the grasping head and the support situated thereunder for a base such as a kneading board or baking sheet to change the spacing between these. In a mechanism of this kind, the spacing cams rotated by a driving system are turned and change the spacing between the grasping head and the support as a function of their eccentricity. To ensure a pause in the distance-varying displacement while said spacing cams rotate, the surfaces of the cams possess a portion of co-axial outline.

In one form of embodiment of the mechanism according to the invention, a vertical displacement of the support plays a part in changing the spacing. In a preferred form of embodiment however, the support is stationary relative to the upright during a change in said spacing. In this case, the kneading board and the baking sheet may be slid into and out of the working space in a simple manner.

The invention also provides a mechanism of the kind specified hereinbefore, which is characterized in that the grasping head comprises grasping devices displaceable by means of cams, so-called transposing cams, and gripping devices which are preferably displaceable by means of so-called gripping cams. In a mechanism of this nature, and in analogous manner to my earlier U.S.A. patent application Ser. No. 609,628, now Patent No. 3,448,865, the grasping devices are arranged around a central point in each instance, connected to guiding means and displaceable through a specific distance away from and back to the central point by means of control devices. As in the case of the U.S.A. patent application cited above, the grasping devices comprise gripping devices, each with two claws, jaws or the like, which are positioned with spacing from each other and are reciprocally displaceable. In the mechanism according to the invention, the motion of the grasping device away from and back towards the central point is performed by means of the so-called transposing cams, and the actuation of the gripping devices, that is to say the movement of the claws or jaws, is performed by means of the gripping cams.

In a preferred form of embodiment of the mechanism according to the invention, the spacing cams as well as the transposing cams and the gripping cams, are arranged on the grasping head and are actuated by means of a shared driving system. In this form of embodiment, the distance-varying motion consists of a vertical displacement of the grasping head. The motions of the grasping head, grasping and gripping devices, corresponding to the mode of operation of the mechanism described earlier, are caused by a single revolution of the spacing cams, transposing cams and gripping cams. A single driving system is employed for the grasping head as a whole.

The invention also consists of a mechanism of the kind specified hereinbefore, which is characterized in that the grasping head displaceable in distance-varying manner relative to the upright and in alignment opposite to a support for a base such as the kneading board and the baking sheet in particular, is arranged in ponderally balanced manner. The grasping head has a relatively great weight. Considerable forces are needed for acceleration and deceleration of this weight. In the mechanism according to the invention, the preponderant part of the weight is balanced by an opposing force, so that only the residual portion of the weight of the grasping head need be accelerated, decelerated and supported.

The fastening of the grasping head on the upright occurs according to another feature of the invention. This fastening is characterized in that the grasping head, which is movable in distance-varying manner relative to an upright and opposite to a support for a base intended in particular for a kneading board or a baking sheet, is jointedly coupled to one end of a cantilever rod or the like, whose other extremity is jointedly coupled to the upper end piece of a column of the upright. The cantilever rod or the like essentially acts as a guiding device for the grasping head displaceable in distance-varying manner, eliminating longitudinal sliding surfaces exposed to dirt. In a form of embodiment of this mechanism, the grasping head is supported on the devices operating the distance-varying displacement of the head, or an auxiliary means such as, in particular, the aforesaid weight-balancing arrangement.

Free lateral access is available to the working space under the grasping head in this mechanism comprising a vertically displaceable grasping head. The mounting of the grasping head permitting vertical displacement of the same is relatively secure against soiling and thus reliable in operation.

In the mechanism of the kind hereinbefore specified, the fastening of the grasping head on the upright is also characterized in that the grasping head is tiltable through 90° and immobilizable, or through more than 90°, about a pivot axis extending at right angles to the longitudinal axis of its grasping devices. During operation of the mechanism, the grasping head is secured against tilting, and the longitudinal axis of its grasping devices extends vertically. After release and tilting of the grasping head, the longitudinal axis of the grasping devices extends horizontally, assuring adequate access to the grasping head for repair, servicing and cleaning work. In the case of a grasping head which is displaceable in distance-varying manner and tiltable, this head may be immobilized on appropriately formed guiding devices, for example on cantilever rods or the like.

The afore-cited features of the mechanism according to the invention are preferably combined. In the form of construction organized for the mode of operation described in the foregoing is combined with the counterbalanced mounting of the grasping head, the driving system displacing the grasping head in distance-varying manner requires but little power, so that the mechanism may be operated in an acceptable manner. Combining the form of embodiment corresponding to the mode of operation specified with the distance-variation system employing spacing cams is advantageous, because control of a periodically repeated sequence of actions by means of cams allows of simple adjustment and correction of this sequence, with said control also being unaffected by dirt, vibrations and wear.

It is advantageous for the grasping head to be secured by means of an articulated cantilever rod or the like, and for distance-variation to occur by means of spacing cams or the like. The difference between the path to be travelled by the grasping head on the cantilever rod, bracket or the like, and that of importance in respect of the vertical displacement of the grasping head, may be allowed for in simple manner in designing the spacing cams. The grasping head is appropriately mounted in a counterbalanced manner, as well as being tiltable through 90°. The total weight of the grasping head tilted through 90° would require bulky auxiliary immobilization means. Due to the counterbalanced mounting, the tilted grasping head may be supported in simple manner. If a counterbalanced mounting method is employed in conjunction with spacing cams, the latter carry but little load and may play a part in bearing the grasping head.

If the grasping head is displaceable by means of spacing cams and tiltable through 90°, the axis of rotation of the spacing cams may also serve as a tilting axis, simplifying the structure of the mechanism. Mechanical ejection by means of the spacing cams is possible, thanks to the application of spacing cams and of control as described of the ejection of a base as a function of a change in spacing.

The invention will now be described with reference to the accompanying drawings, which illustrate the invention but in no restrictive sense.

Figure 1:
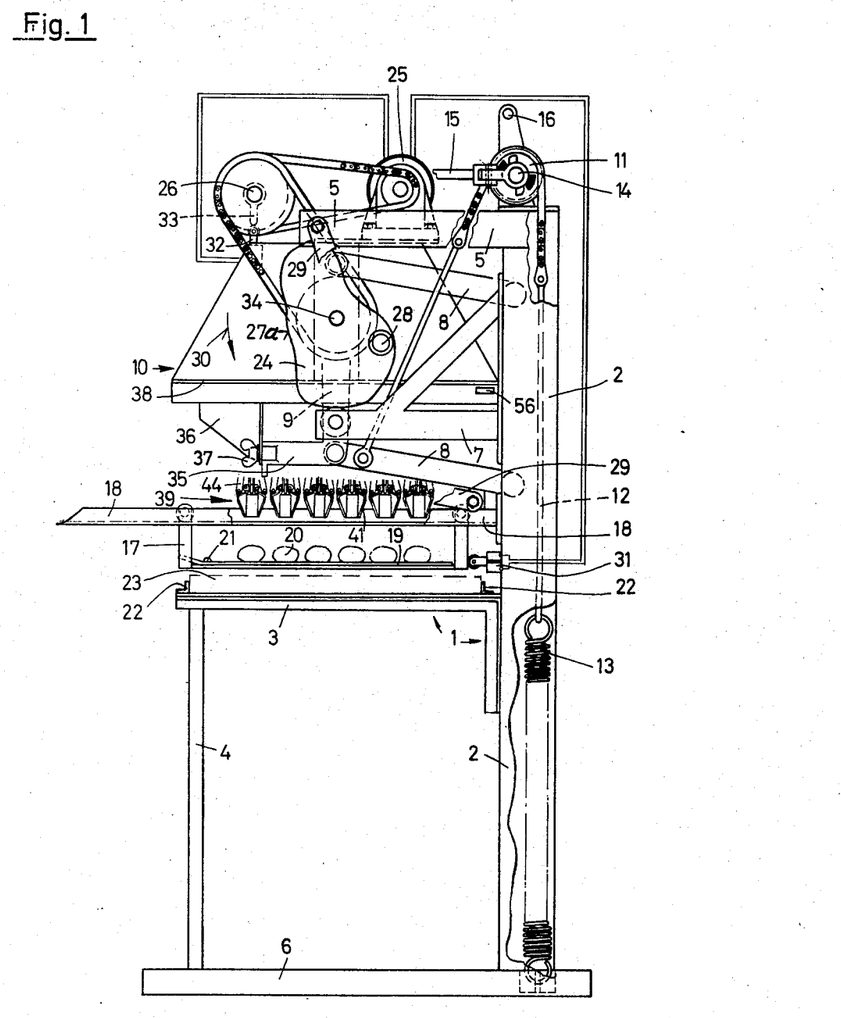
FIGURE 1 shows a lateral view of a mechanism for transposing pieces of dough, as a whole.
Figure 2:
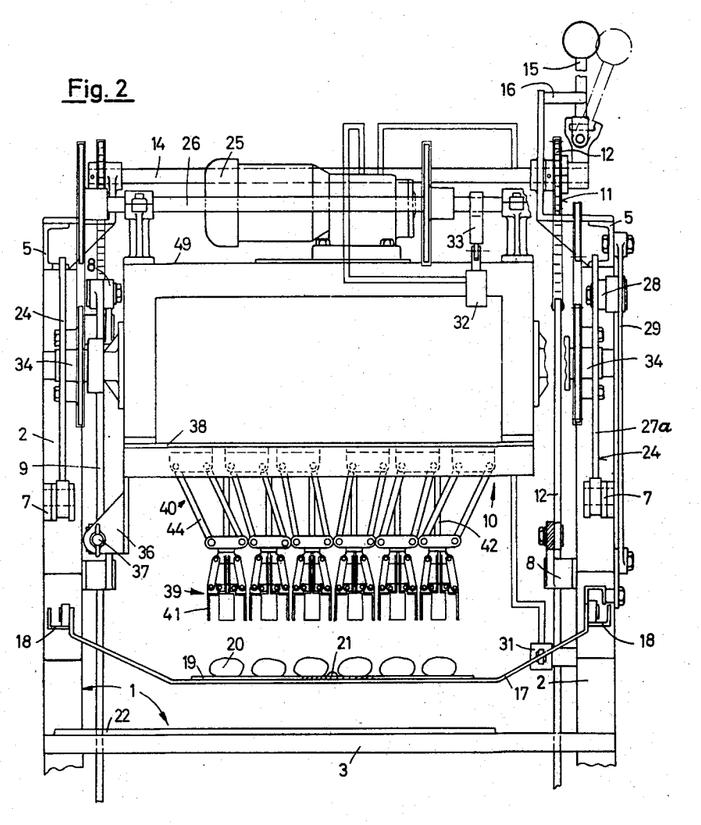
FIGURE 2 shows a front view of the upper part of the mechanism of FIGURE 1.
Figure 3:
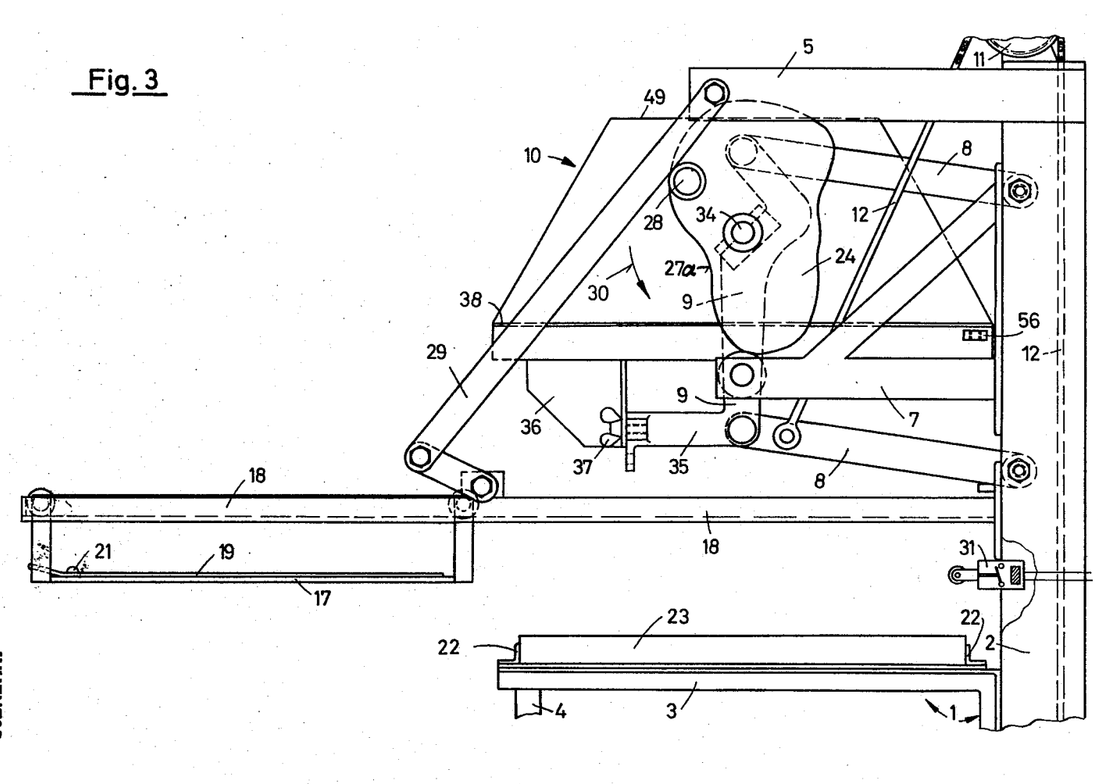
FIGURE 3 shows a lateral view of the upper part of the mechanism of FIGURES 1 and 2.

Some components of the device have not been illustrated in all the figures. For example, components employed for immobilization of a tiltable grasping head and shown in FIGURE 1, are not depicted in FIGURES 2 and 4. FIGURE 3 does not show grasping devices moreover.

The mechanism illustrated possesses an upright 1, which at the rear comprises two vertically extending columns 2 set at a distance from each other. In the median area of the two columns 2, these have fastened thereto a bed-plate 3 extending forwardly horizontally, which is supported at the front by two legs 4 extending downwardly vertically. The structure of the upright 1 resembles that of a chair, with the part of the columns 2 extending above the bed-plate 3 corresponding to the back-rest of a chair. On its upper end, each column 2 bears an arm 5 extending forwardly horizontally. At their lower extremities, the columns 2 and the legs 4 are interconnected by two bottom stays 6. An abutment 7 projecting towards the front like an outrigger, is finally fastened rigidly on each column 2 between the bed-plate 3 and each arm 5.

Each column 2 has an upper cantilever rod or link 8 hingedly connected to it close to the arm 5, and a lower link 8 below the abutment 7, with two links 8 being equal in length, projecting toward the front parallel to each other and being interconnected at their freestanding extremities by a bearing stay 9. A grasping head 10 is situated between the two stays 9 extending approximately vertical, that is to say between two of the four links 8 in each instance, and is fastened to the bearing stays. The working space under the grasping head is not cluttered with devices for connection of the grasping head to the upright 1, and is accessible from the sides. The grasping head 10 is guided by the two pairs of links 8 and is displaceable in a vertical direction along an arc of great radius. During a variation in the spacing, the two bearing stays 9 are rigid with respect to the grasping head 10 and are displaced only parallel to themselves.

A guide pulley 11 for a cable or rope, is arranged on the upper extremity of each column 2. Each of two cables 12 is fastened at one end to the grasping head 10, by being secured to the lower link 8 close to its extremity connected to the bearing stay 9. Each of the cables 12 extends upwardly obliquely from the grasping head 10 to the guide pulleys, around the latter and along the column 2 towards the bottom. The extremity of each cable 12 along the column 2 is connected to one extremity of a spring 13 in the form of a traction spring intended for counterbalancing, with the other extremity of the spring being connected to the bottom stays 6 of the upright 1. The spring 13 is of such length and is so tensioned, that its force varies but insignificantly during the tensioning and de-tensioning spring deflections corresponding to the distance-variations of the grasping head 10. A heavy counterweight may also be employed, instead of the spring 13. The grasping head 10 is mounted in a counterbalanced manner by means of the guide pulley 11, cable 12 and spring 13, with the force of the spring balancing a part of the weight of the grasping head.

To increase friction, the two cables 12 have chains intercalated in the area of the guide pulleys 11, the latter consisting of sprockets in this case, which are situated on a shared shaft 14. A detent lever 15 situated on the shaft 14, may be brought into engagement with cogs of the pulleys, extends at right angles to the shaft and is foldable upon itself about an axis extending at right angles to itself and to the shaft. A stop 16 is secured on the one of the columns 2 of the upright close to the detent lever 15 in such manner that it would be in contact with the unfolded detent lever when the grasping head 10 which may be displaced up and down vertically, assumes an upper position, and it would then prevent rotation of the pulleys and a downward displacement of the grasping head. The cable 12 may thus be immobilized longitudinally relative to the upright 1.

The mechanism comprises a carriage 17 which may be displaced rectilinearly and horizontally from the front to the rear, that is to say from laterally in front of the grasping head 10 as far as below the grasping head. The carriage 17 has a horizontally positioned base and four extensions thereof which project upwardly. The extensions bear wheels which run in track-like carriage guides 18. Each carriage guide 18 is fastened to one of the columns 2 above the bed-plate 3, and projects from the same forwardly horizontally and over the bed-plate 3 at least by the length of the carriage 17. The carriage base situated lower than the carriage guides 18 is spaced apart from the bed-plate 3.

The carriage 17 is extracted when it is situated in front of the grasping head 10, and is inserted when it is situated under the grasping head. When the carriage 17 is extracted, a kneading board 19 may be laid on the carriage base between the base extensions. The kneading or molding board 19 is immobilized in a horizontal direction on the carriage base. A peg or stud 21 projecting through an opening in the kneading board 19, and extending upwardly from the carriage base, serves this purpose among other things. When the carriage 17 is inserted, it represents a support for the kneading board 19 forming a base, which is not displaceable along the upright 1 in a distance-varying manner relative to the grasping head 10.

The bed-plate 3 has arranged thereon two ledge-like baking sheet guides 22 facing towards the grasping head 10, which extend from left to right, parallel to each other and with spacing from each other, below the grasping head. A baking sheet 23, which term may be taken to mean other kinds of bases such as a stowing board for example, is displaceable by a horizontal and rectilinear trajactory on the bed-plate 3 and between the baking sheet guides 22 under the grasping head 10 as well as below the inserted carriage 17. In this device, the trajectory of the kneading board 19 runs from the front to the rear or vice versa, and the trajectory of the baking sheet runs from right to left or vice versa. The trajectories of the kneading board 19 and of the baking sheet 23 relative to the grasping head 10 thus extend at right angles to each other. The two trajectories do not actually interesect under the grasping head 10, but extend at a distance and one above the other at their crossing point. The trajectory of the kneading board 19 moreover does not run through beneath the grasping head 10, but is reversed thereat. By contrast, the trajectory of the baking sheet 23 runs through under the grasping head 10, that is to say through the working space situated beneath the grasping head.

The mechanism comprises two spacing cams 24 displacing the grasping head 10 and the inserted carriage 17 or the bed-plate 3 supporting the kneading board 19 or the baking sheet 23, relative to each other in a distance-varying manner. The two spacing cams 24 are in each instance rotatably secured relative to and on one of the sides of the grasping head 10 facing towards one of the links 8, and on the one hand bear against the grasping head 10 and on the other hand against the upright 1. To this end, they bear with their peripheral track 27a against one of the two abutments 7 in each case, or against an abutment roller arranged thereon to reduce friction.

A driving system 25 in the form of an electric motor is arranged at the top on the grasping head 10 and turns the spacing cams 24 by means of sprockets and endless chains through a driving spindle 26. The right-hand spacing cam 24 turns in an anticlockwise direction 30 as seen from outside the mechanism. The driving spindle 26 is situated at the front and top on the grasping head 10, and extends horizontally in the direction of the trajectory of the baking sheet 23 and, in manner described further on, serves the purpose of moving and actuating the grasping devices 39 of the grasping head 10. The speed of revolution of the driving spindle is equal to that of the spacing cams 24.

A major proportion of the weight of the grasping head 10 is carried by the two springs 13 through the two cables 12, whereas the minor proportion of the weight is carried by the spacing cams 24. This minor proportion of the weight prevents an uncontrolled upward displacement of the grasping head 10. The spacing cams 24 prevent an uncontrolled downward displacement of the grasping head 10.

The track 27a of each spacing cam 24 has at least one "close" portion corresponding to a short distance between the grasping head 10 and the support, and at least one "distant" portion corresponding to an appreciable distance between the grasping head and the support. In the case of the spacing cams illustrated, a substantial radius of the track 27a corresponds to a "distant" portion and a shorter radius to a "close" portion. Each spacing cam 24 possesses an initial "distant" portion, for which the grasping head 10 has been displaced right to the top, an initial "close" portion, for which the grasping head has been lowered towards the kneading board 19, a second "distant" portion for which the grasping head has been lifted off the kneading board, and a second "close portion for which the grasping head is lowered towards the baking sheet 23. Corresponding to the initial "close portion equivalent to the grasping head 10 being lowered to the kneading board 19, at least, the track 27a extends in an arc of a circle relative to the axis of rotation of the spacing cam 24. A pause in the distance-varying displacement of the grasping head, during which the grasping devices 39 operate, occurs while this first "close" portion runs past the abutment 7.

The track 27a also advantageously extends in arcuate form in the three other portions, which correspond to the releasing action of the grasping devices 39, the insertion of the kneading board 19 and to exchange of the base, that is to say exchange of the baking sheet for the kneading board.

Each of the spacing cams 24 carries an outwardly directed ejection cog 28 close to the portion of its track 27a which holds the grasping head 10 close to the kneading board 19 for grasping action. The corresponding side of the carriage 17 has one extremity of a double hinged element 29 articulated at the rear, with the other extremity thereof being articulated to the freestanding extremity of one of the arms 5. Each ejection cog 28 is constantly positioned between the one column 2 and the one double hinged element 29. If the spacing cam 24 has assumed the position for which the grasping action of the grasping devices 39 is completed and the grasping head 10 and the support of the kneading board 19 begin to separate, the ejection cog 28 is in contact with the double hinged element 29. In this embodiment, a spacing cam 24 ejects the carriage 17 and ejection of the kneading board 19 from the working space situated below the grasping head 10 occurs as a function of distance-variation of the grasping head 10 with respect to the support of the kneading board, with a delay after the beginning of an increase in said spacing, which follows upon a grasping action by the grasping devices 39 of the grasping head.

A switch-on element 31 and a switch-off element 32 are incorporated for the driving system 25 of the spacing cams 24. The switch-on element 31 is situated on a column 2 and is connected to the driving system 25 by two electrical conductors. When the carriage 17 is fully inserted, it exerts a thrust on the switch-on element organized to switch on the driving system 25. The switch-off element 32 is positioned on the grasping head 10 below the driving spindle 26 and is equally connected to the driving system 25 by two electrical conductors. A switch-off cog or striker 33 which turns with the driving spindle 26, is rigidly secured on the same. In the position of the driving spindle 26 for which the grasping head 10 is at the end of its upward displacement, the switch-off cog 33 exerts a thrust on the switch-off element 32 such as to switch off the driving system 25. The switch-off element 32 and the switch-on element 31 may act on the motor or on a clutch in the transmission system 25.

A short horizontal spindle 34 on which one of the two spacing cams 24 is rotatably arranged, is situated at either side on the grasping head 10. Each spindle 34 is secured in its turn to one of the bearing stays 9. The grasping head 10 is tiltable through 90° about the two spindles 34, with the shared central axis of the spindle 34 being the tilting axis of the grasping head. A projection 35 provided at the lower end of the bearing stay 9 and extending at right angles to the same, bears against a stop 36 provided on the grasping head 10 when the latter is tipped over. The projection 35 and the stop 36 may be connected releasably by means of a wing nut 37. A tilting stop 56 is arranged on one column 2 close to the grasping head 10 and is in contact with the projection 35 when the grasping head has been tipped over.

The grasping head 10 is constructed in the manner of a gripping or grapling head and possesses a bearer plate 38 extending horizontally in the untilted condition, in which downwardly pendant gripping devices acting as grasping devices 39 are arranged by means of a guiding device 40 in each instance. Each guiding device 40 comprises two parallel guide levers 44 by means of which the grasping device 39 is movably connected to the bearer plate 38. Each gripping device comprises at least two claws or jaws 41 displaceable relative to each other, and a claw actuating rod 42 extending in a substantially vertical direction. When the claw actuating rod 42 is moved back and forth in the direction of its longitudinal axis, the claws 41 are moved relative to each other and the gripping device performs the gripping or releasing action. Each unit comprising a grasping device 39 and a guiding device 40 moreover includes a coupling rod 43 extending in a substantially vertical direction and acting at one extremity on the guiding device 40. If the coupling rod 43 is displaced in the direction of its longitudinal axis, the grasping device 39 performs its repositioning action.

Reference is made to my earlier U.S. patent application cited in the foregoing, with the detailed structure of the grasping devices 39 constructed in the form of gripping devices, as well as the fastening of the grasping devices 39 on the bearer plate 38, and the detailed structure of the guiding devices 40 forming the object of said application.

At their upper extremities, the coupling rods 43 of all grasping devices 39 are in each instance connected to one of two horizontally extending and vertically displaceable control plates 45 arranged one above the other, by means of devices 46 arranged to delay displacement. This coupling method forms an object of my earlier U.S. patent application, and to which reference is made.

In the mechanism, the grasping devices 39, the means for actuating and displacing the grasping head 10, including the guiding devices 40, the driving spindle 26, the gripping cam 55, repositioning cam 50, spacing cams 24 and driving system 25, form an unit which is held together by the bearer plate 38 and a roof plate 49 situated thereabove. This unit may be removed as a whole from the mechanism. This unit comprising the grasping head may therefore be constructed and specified in largely independent manner from the rest of the mechanism.

Each of the two control plates 45 carries upwardly projecting control rods 47 which are guided in bushings 48 of the horizontally extending roof plate 49, protrude out of the latter at the top, and are displaceable back and forth in the direction of their longitudinal axis. Pairs of repositioning cams 50 acting on upper end-pieces 51 of the control rods 47, are situated on the driving spindle 26. One repositioning cam 50 in each of these pairs is so constructed and acts in such manner with its track 27b on the upper end-piece 51 of a control rod 47, that it pushes the control rod 47 downwardly during its rotation. The other repositioning cam 50 in each pair is so constructed and acts in such manner with its track 27b on the upper end-piece 51 of a control rod 47, that it pushes this control rod upwardly during its rotation.

So that a grasping device 39, during constant rotation of the driving spindle, may remain in one position for a specific period and in a second period for a specific period, the tracks 27b of the repositioning cams 50 possess two concentric portions of different radius. When the upper end-piece 51 of a control rod 47 bears on the portion of shorter radius, the control rod is drawn upwardly and the grasping device 39 is in the first position, and when the upper end-piece 51 bears on the portion of greater radius, the control rod 47 is pushed downwardly and the grasping device 39 is situated in the second position. The period during which the grasping device 39 remains in one of these positions is determined by the size of the arc of the concentric portion. The beginning or end of the displacement of a control plate 47 occurs when the upper end-pieces 51 of the control rods reach the transition between an eccentric portion. The beginning of the displacement of one control plate 45 is delayed relative to that of a second one, by the configuration of the track 27b of the corresponding repositioning cam 50 and tracks to arranging the repositioning cams on the shared driving spindle 26.

In a form of embodiment, which is not illustrated, and in which the repositioning cams and the control rods acts in conjunction, the upper end-piece of each control rod carries a laterally projecting peg, with the guiding tracks of the two repositioning cams of a pair bearing against this peg. In a form of embodiment of repositioning cams, which is not shown, one of these is provided as an internal cam and one as an external cam. The two tracks of one pair extend parallel to each other.

In the form of embodiment illustrated, the repositioning cams 50 act through lever transmission systems 58 on the upper end-pieces 51 of the control rods 47. Each lever linkage 58 comprises lever arms rigid relative to each other and rotatable about a shared axis, of which one acts in conjunction with the upper end-piece 51 of one control rod 47 and the other acts in conjunction with repositioning cams 50, and which are swivelled back and forth about the shared axis by the repositioning cams. A lever arm operating in conjunction with the upper end-piece 51 of a control rod 47 engages with a denticulation in a denticulation of the upper end-piece 51. In a form of embodiment which is not shown in detail, one lever arm is jointedly and displaceably connected to the upper end-piece of a control rod in such manner that on being swivelled, it causes the control rod to be displaced back and forth.

The claw actuating rods 42 are in contact through their upper extremities with a horizontally situated claw actuation plate 52, which carries upwardly projecting claw displacing rods 53, which are reciprocatingly displaceable. The driving spindle 26 carries the gripping cams 55 whereof the tracks 27c act on the upper end-pieces 54 of the claw displacing rods 53. In a form of embodiment, which is not illustrated, pairs of gripping cams are incorporated, which cause the inward as well as outward displacement of the claw displacing rods. In the form of embodiment illustrated, the claw displacing rods 53 are thrust in one direction only by gripping cams 55, and are displaced in the other direction by means of a spring-actuated return device 57. Each gripping cam 55 acts through a lever on a claw displacing rod 53, which in turn acts through a lever on the claw actuation plate 52.

Pieces of dough 20 may be transposed from a first base, the kneading board 19, onto a second base, the baking sheet 23, while being repositioned, by means of the mechanism illustrated. The mechanism means, the driving spindle 26, the grasping head 10 and its grasping devices 39, prior to beginning the transpositioning of a batch of pieces of dough 20. With the spacing cams 24 at rest, the grasping head 10 is moved upwardly. The spacing cams 24 bear with the first "distant" portion of their track 27 on the abutment 7. A kneading board 19 carrying pieces of dough 20 is situated on the carriage 17, which is positioned in front of the working space situated under the grasping head 10. The baking sheet 23 is empty and in readiness to receive the pieces of dough 20 present on the kneading board 19. The position of the spacing cam 24 is such that the kneading board 19 may be pushed into the working space. The kneading board 19 is then pushed into the working space, thereby actuating the switch-on element 31. The setting of the mechanism operative at this moment is shown in FIGURES 1 and 2.

Figure 4:
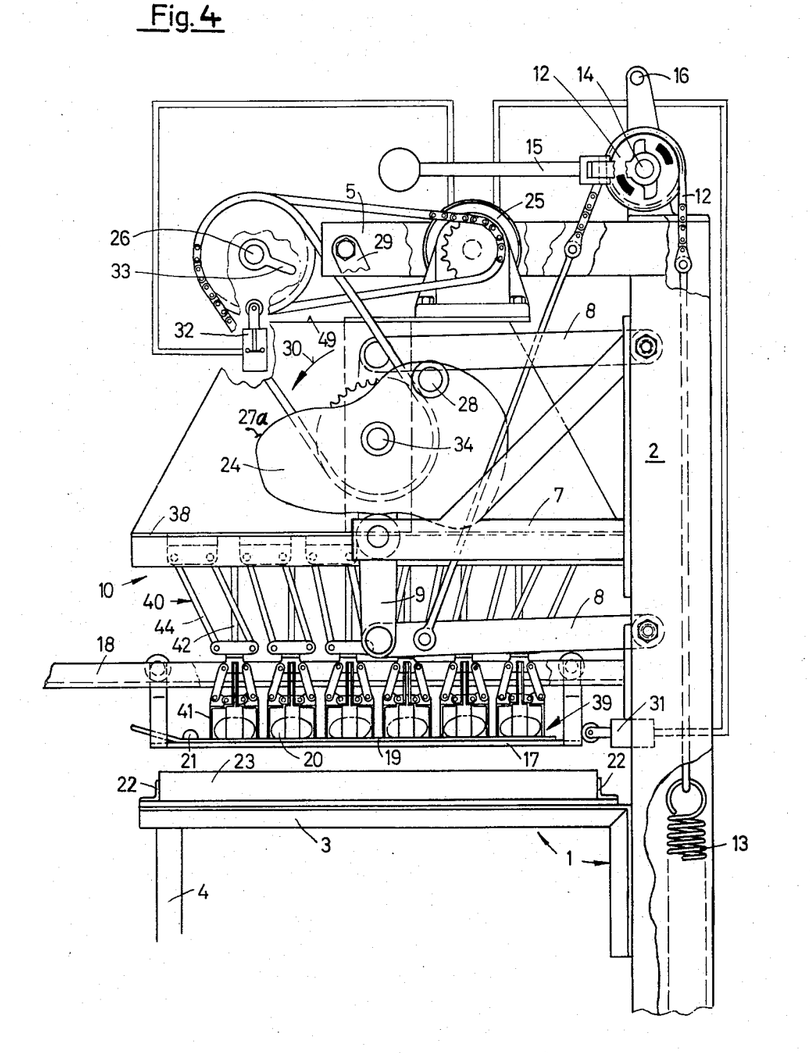
FIGURE 4 shows a lateral view corresponding to FIGURE 3 for another setting of the mechanism.

Upon being actuated, the switch-on element 31 causes transmission of drive to the driving spindle 26, and thus to the grasping head 10, the grasping devices 39 and their claws 41. The grasping head 10 is displaced downwardly, until its grasping devices 39 can grasp the pieces of dough 20. The spacing cams 24 are then in operation with the first "close" portion of their tracks 27a. The claws 41 of each of the grasping devices 39 constructed as gripping devices run parallel to each other and grasp therebetween a piece of dough 20. The backing sheet 23 is pushed into the working space on the bed-plate 2. The setting operative at this moment is shown in FIGURE 4.

The pieces of dough 20 are then gripped by the grasping devices 39. The grasping head 10 is then moved upwardly. The ejection of the carriage begins during the upward displacement and/or during a pause in displacement in an upper position. The ejection begins when the ejection cog 28 bears against the double articulated element 29. The grasping devices 39 hold the pieces of dough 20 during the ejection. A setting of the mechanism operative at the end of the ejection is shown in FIGURE 3. The spacing cams 24 are then in operation with the second distant portion of their tracks 27a. The ejection cog 28 of each spacing cam 24 thrusts the corresponding double articulation element 29 towards the front. At the end of the ejection, the emptied kneading board 19 is positioned in front of the working space, the pieces of dough 20 are held by the grasping devices 39 and the grasping head 10 may contingently already be in process of being lowered.

Figure 5:
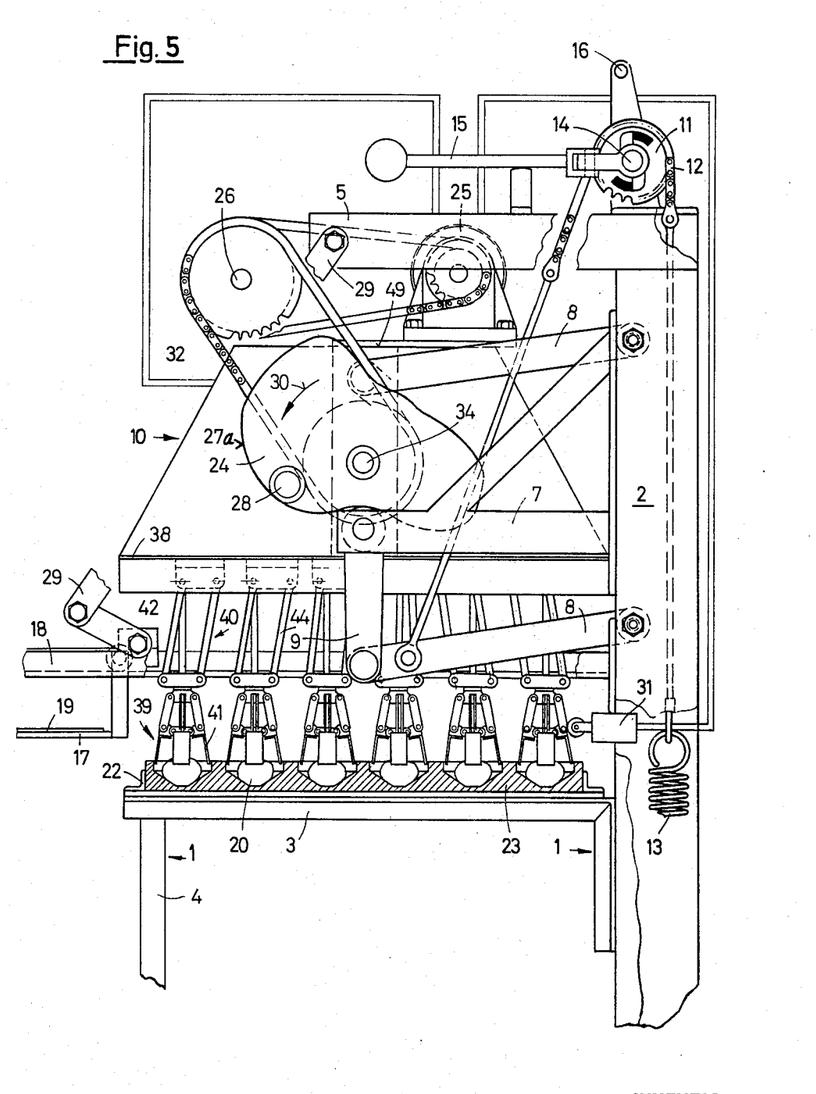
FIGURE 5 shows a lateral view corresponding to FIGURES 3 and 4, for another setting of the mechanism.

In the meanwhile, an unoccupied area of the baking sheet 23 has been moved into the working space under the grasping head for reception of the pieces of dough 20 held by the grasping devices. The grasping head 10 is lowered towards the baking sheet 23. The grasping devices 39 release the pieces of dough 20 by opening their claws 41. The pieces of dough 20 drop on to the baking sheet 23. The spacing cams 24 concomitantly bear with the second "close" portion of their tracks 27a. The working space is occupied by the grasping devices 39. A setting of the mechanism operative during the laying-down of the pieces of dough 20 is shown in FIGURE 5.

After the laying-down operation, the grasping head 10 is displaced upwardly, during rotation of the driving spindle 26. The switch-off cog 33 turns with the driving spindle 26. When the cog strikes the switch-off element 32, this stops the driving spindle 26 and thus the mechanism. The corresponding position of the switch-off cog 33 is shown in FIGURE 1.

Figure 6:
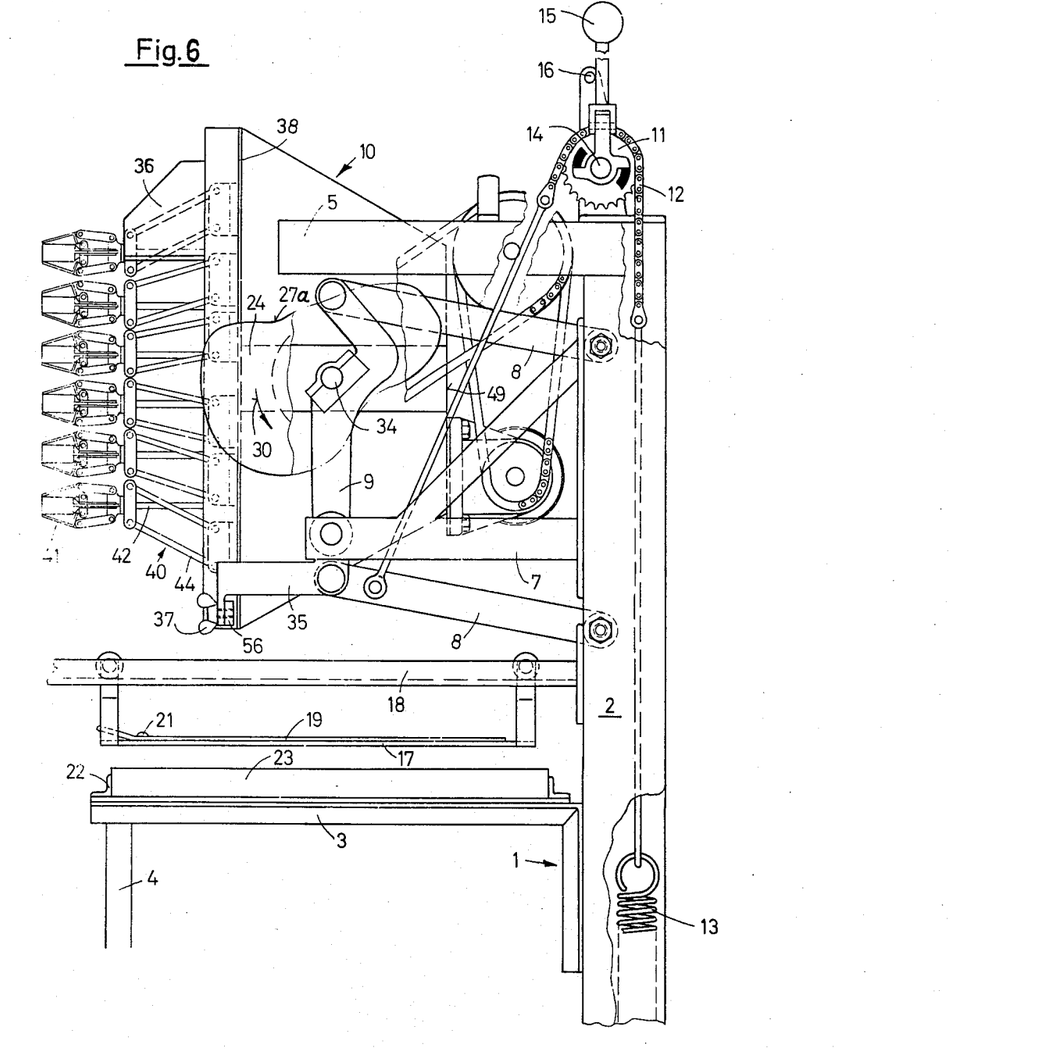
FIGURE 6 shows a lateral view corresponding to FIGURES 3, 4 and 5, for another setting of the mechanism.
Figure 7:
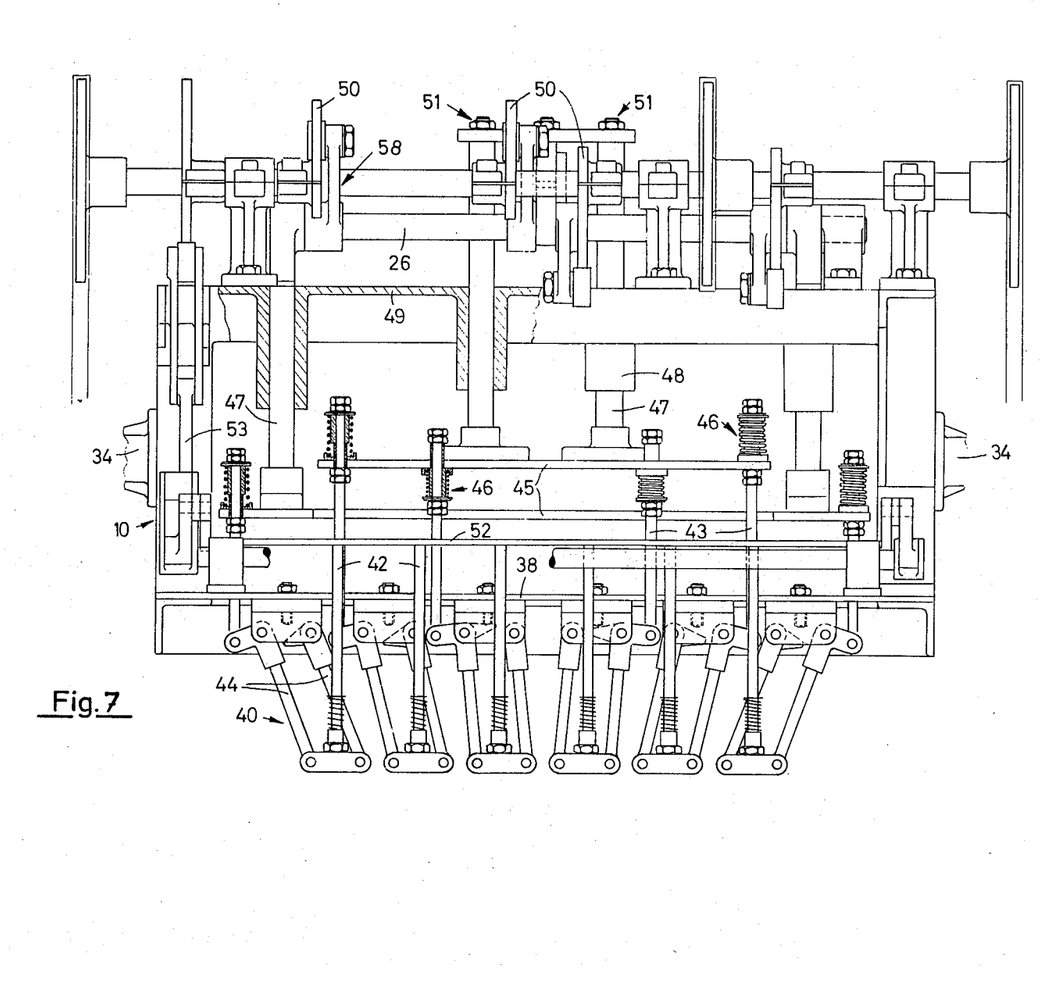
FIGURE 7 shows a front view of a grasping head for the mechanism.
Figure 8:
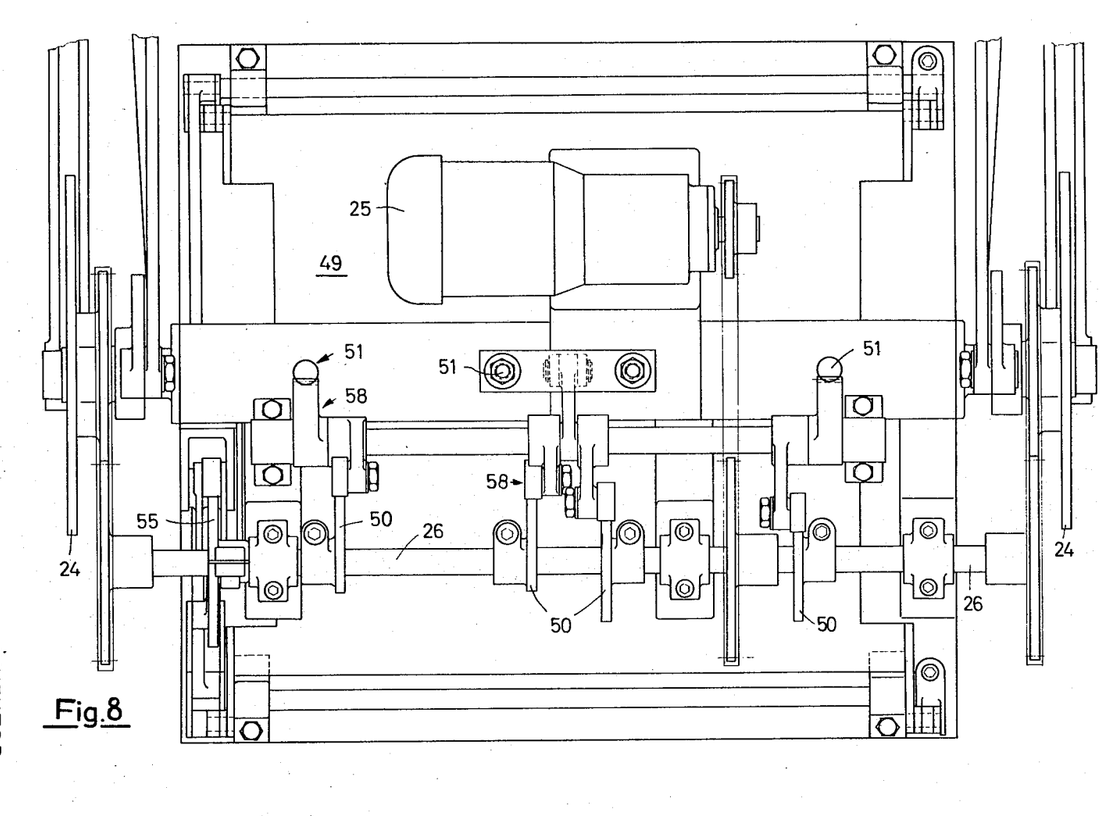
FIGURE 8 shows a plan view of the grasping head of FIGURE 7.
Figure 9A:
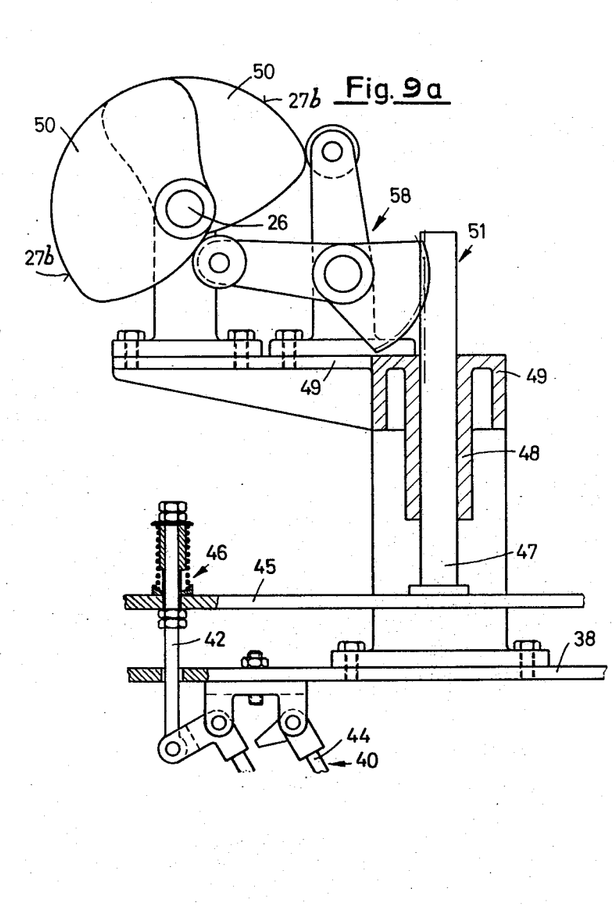
FIGURES 9a and 9b showing a detail of FIGURE 8, in two different position.
Figure 9B:
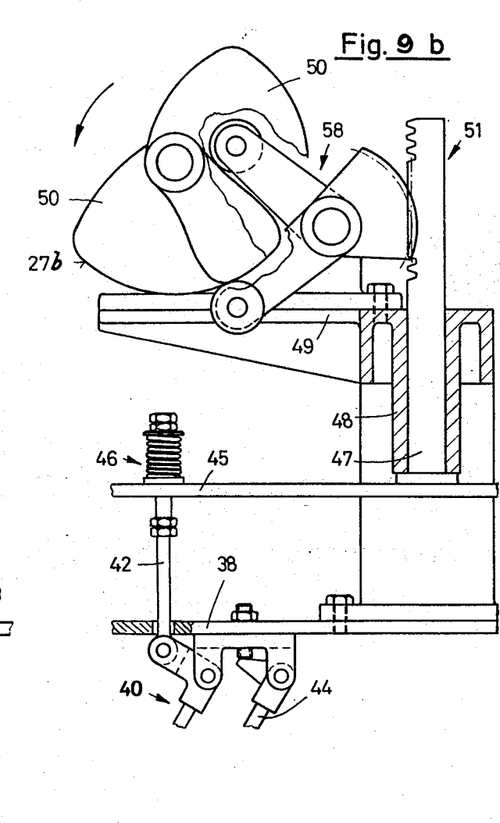
Figures 10A, 10B:
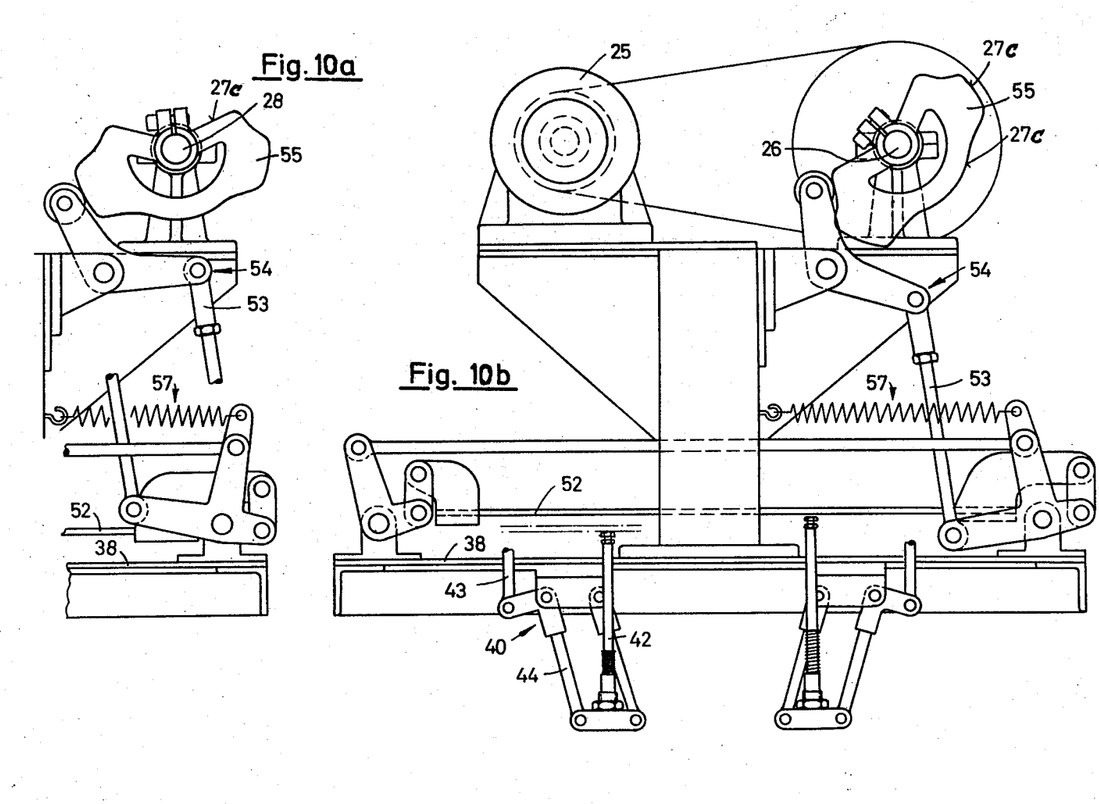
FIGURES 10a and 10b showing a detail of FIGURES 7 and 8, in two different positions.

The grasping head 10 is tiltable through 90° about the spindles 34 in such manner that its grasping devices project towards the front. To this end, the wing nut 37 connecting the stop 36 and the projection 35, is released. The cables 12 are immobilized by laying the detent lever 15 against the stop 16. The cables 12 thus bear the entire weight of the grasping head 10. The spacing cams 24 are separated from the abutments 7. The grasping head 10 may then be tipped over. The tipped grasping head 10 is immobilized relative to the upright 1, by connecting the stop 56 to the projection 35 by means of the wing nut 37. This setting of the mechanism is illustrated in FIGURE 6.

Additional features of the mechanism according to the invention are apparent from the drawings. These additional features preferably consist of the interlinking between individual components of the mechanism and of the structure of individual devices of the mechanism. Although not described in general or in particular, these features equally form objects of the invention.

I claim:
1. A mechanism for transposing pieces of dough from a kneading board onto a baking sheet or the like, including a grasping head comprising a bearer plate and a plurality of grasping devices attached to and projecting from said bearer plate, an upright to which said head is attached for upward and downward movement, spacing cams, a driving means for rotating said cams, said cams bearing on the upright on the one hand and on the grasping head on the other hand, said cams, upon rotation, serving to move said head upwardly and downwardly, an abutment mounted on said upright, each cam having an outer track for abutting on said abutment, the outer track having successively a first distant portion with a larger radius, a first close portion with a smaller radius, a second distant portion with a larger radius, and a second close portion with a smaller radius, first guide means attached to said upright and on which a baking sheet or the like is laterally displaceable and said first and a second guide means extending into the space under the grasping head so that a kneading board as well as a baking sheet or the like are displaceable into and out of such space.

2. The mechanism as claimed in claim 1 in which the guide means for the kneading board and the baking sheet or the like are at right angles to one another.

3. The mechanism as claimed in claim 1 in which said guiding means for the kneading board and the baking sheet or the like are spaced at a vertical distance from one another.

4. The mechanism as claimed in claim 1 in which said driving means includes a switch on element provided in the path of movement of the kneading board below said grasping head and a switch off element actuable dependent on the upward and downward movement of the grasping heads.

5. The mechanism as claimed in claim 1 in which the grasping head which is moveable to change the position in relation to the upright and relative to a holder for the kneading board and/or the baking sheet or the like located therebelow, is articulatedly connected to one end of a link with the other end thereof being articulated to an upper end piece of a column of the upright.

6. The mechanism as claimed in claim 1 in which said grasping head is mounted in a weight equalizing manner.

7. The mechanism as claimed in claim 1 in which said grasping head is connected in a weight equalizing manner by a cable trained about a pulley provided with a compensating spring, with means to fix the cable against movement with respect to the upright.

8. The mechanism as claimed in claim 1 in which said grasping head is fixable in one vertical position and is mounted so as to tilt through at least 90° about a tilting axis which extends at right angles to the longitudinal axis of the grasping devices.

9. The mechanism as claimed in claim 1 in which said spacing cams are rotatably mounted on said grasping head and said driving means is provided on said grasping head.

10. The mechanism as claimed in claim 1 in which each of said spacing cams is rotatably mounted on a spindle by which said grasping head is mounted tiltably on said upright.

11. The mechanism is claimed in claim 1 in which the expulsion of a kneading board from the space below said grasping head is effected dependent upon a change of the distance of said grasping head relative to the holder of the base plate after a delay following actuation of the grasping devices of said grasping head.

12. The mechanism as claimed in claim 1 in which one of said spacing cams expels a base plate.

13. The mechanism as claimed in claim 1 in which said grasping head is provided with repositioning cams for moving said grasping devices, pairs of said repositioning cams having tracks corresponding to one another and engageable with upper end pieces of control rods and during rotation thereof moving said control rods to and fro, said control rods being capable of being moved to and fro in the direction of their longitudinal axis and are arranged to reposition said grasping devices, and said tracks said repositioning cams being located on one common drive spindle and having central sections of a different arc with respect to the start and end thereof.

References Cited
UNITED STATES PATENTS 3,168,204    2/1965    Voullaire _________ 53—247 X
3,272,360    9/1966    Van Der Schoot _____ 214—309
3,327,872    6/1967    Madden.

FOREIGN PATENTS 624,238    2/1963    Belgium.

GERALD M. FORLENZA, Primary Examiner

G. F. ABRAHAM, Assistant Examiner

U.S. Cl. X.R.
214—147, 309